United States Patent [19]

Kumasaka et al.

[11] Patent Number: 5,230,734
[45] Date of Patent: Jul. 27, 1993

[54] CALCIUM-MAGNESIUM CARBONATE COMPOSITE AND METHOD FOR THE PREPARATION THEREOF

[75] Inventors: Tetsuo Kumasaka, Hachioji; Hideki Horiuchi, Ome; Fumihiko Kaneko, Hamura; Tatsuo Takano, Ome, all of Japan

[73] Assignee: Okutama Kogyo Co., Ltd., Tokyo, Japan

[21] Appl. No.: 917,163

[22] Filed: Jul. 20, 1992

[30] Foreign Application Priority Data

Jul. 29, 1991 [JP] Japan ................... 3-210498

[51] Int. Cl.$^5$ ............................. C09C 1/02
[52] U.S. Cl. .................... 106/464; 162/181.4
[58] Field of Search ................... 106/463, 464; 162/181.2, 181.4

[56] References Cited

U.S. PATENT DOCUMENTS

| | | | |
|---|---|---|---|
| 2,105,503 | 1/1938 | Rafton | 134/58 |
| 3,197,322 | 7/1965 | Maskal et al. | 106/306 |
| 3,869,299 | 3/1975 | Periard | 106/306 |
| 4,824,654 | 4/1989 | Ota et al. | 423/432 |

FOREIGN PATENT DOCUMENTS 530220  9/1991  France .

OTHER PUBLICATIONS

Database WPIL Section Ch, Week 8827, Derwent Publications Ltd., London, GB; Class A60, AN 88-186570 & JP-A-63 123 810 (Kamishima Kagaku) *abstract*.

*Primary Examiner*—Mark L. Bell
*Assistant Examiner*—Chris Gallo
*Attorney, Agent, or Firm*—Wyatt, Gerber, Burke & Badie

[57] ABSTRACT

A calcium-magnesium carbonate composite consisting of particles of calcium carbonate and magnesium carbonate hydroxide and having excellent properties, for example, as a pigment for paper coating is proposed, which is a uniform blend of:

(A) particles of calcium carbonate having a crystalline structure of aragonite with a columnar particle configuration having a length in the range from 0.5 to 3 $\mu$m and a diameter in the range from 0.1 to 0.3 pm with an aspect ratio in the range from 5 to 15; and (B) particles of magnesium carbonate hydroxide having a plate-like particle configuration with a particle diameter in the range from 2 to 7 $\mu$m and a thickness in the range from 0.05 to 0.5 $\mu$m, the blend having an overall specific surface area in the range from 15 to 30 m$^2$/g and the weight proportion of the particles of calcium carbonate to the particles of magnesium carbonate hydroxide being in the range from 95:5 to 50:50 calculated as the respective hydroxides. The carbonate composite can be prepared by the step-wise carbonation reaction of a mixed aqueous slurry of calcium and magnesium hydroxides with carbon dioxide gas under very strictly controlled conditions.

5 Claims, No Drawings

CALCIUM-MAGNESIUM CARBONATE COMPOSITE AND METHOD FOR THE PREPARATION THEREOF

BACKGROUND OF THE INVENTION

The present invention relates to a calcium-magnesium carbonate composite and a method for the preparation thereof. More particularly, the invention relates to a calcium-magnesium carbonate composite having excellent whiteness and a reinforcing effect on plastics and useful as a pigment in paper coating capable of giving excellent characteristics to the coated paper as well as a filler in polymeric materials.

As is well known, calcium carbonate powders have excellent whiteness and other desirable properties so that they are consumed in large quantities as a filler or pigment in a variety of fields including the industries of paper, rubbers, plastics, paints and the like. Particles of calcium carbonate have a crystalline structure of calcite giving cubic or spindle-like particles, aragonite giving columnar or acicular particles, vaterite giving spherical particles or the like. It is usual that a calcium carbonate powder is prepared by the carbonation of calcium hydroxide in an aqueous slurry or a lime milk using carbon dioxide gas or a carbon dioxide-containing gas blown into the slurry.

Though excellent in respect of the whiteness and absorptivity of printing inks when used as a pigment for paper coating as compared with kaolin clay consisting of platelet particles, conventional calcium carbonate fillers have a serious defect that the paper coated by using the same is generally poor in the white-paper gloss, printing gloss, printing strength and the like. Attempts and proposals have been made for the preparation and application of a calcium carbonate filler predominantly consisting of plate-like or flaky particles, with which the above mentioned problems could be solved, but no such a product is commercially available because of the high costs for the production of such a calcium carbonate powder.

Carbonates of magnesium, such as magnesium carbonate hydroxide, i.e. basic magnesium carbonate, are also widely employed as an inorganic filler in various polymeric products including rubbers and plastics or, in particular, as a filler for transparency formulation of natural rubbers. Magnesium carbonates in general have a plate-like or flaky particle configuration to exhibit a reinforcing effect as a filler in plastics. They are also used as a white filler or pigment in the applications for paints, cosmetic compositions, paper coating and the like as well as carrier of medicines and perfumes. Magnesium carbonates, however, have a defect that the reproducibility of coloring by use thereof is poor when they are used in combination with other pigments or fillers or, in particular, natural talc.

Several methods are known and practiced for the preparation of a magnesium carbonate hydroxide filler including carbonation of magnesium hydroxide, alkali carbonation of bittern or magnesium chloride, thermal decomposition of magnesium hydrogencarbonate and so on. When the method is performed by a wet process in an aqueous suspension or slurry, however, a difficulty is encountered that the slurry sometimes has an unduly high consistency due to the fine platelet-like particle configuration of the particles which also leads to a trouble that the particles are readily converted into a hard cake which must be dried with some difficulties and subsequently disintegrated into a fine powder before the reaction product is practically used.

Conventional magnesium carbonate hydroxide fillers usually have a bulk density so low that difficulties are encountered in the compounding work of the same with a synthetic resin into a uniform blend. Proposals have been made to solve this problem in Japanese patent Kokai No. 60-54915, No. 51-63526, No. 63-89416 and No. 1 224218 according to which spherical secondary particles are formed from the fine plate-like primary particles of the magnesium carbonate hydroxide.

It is a general problem or disadvantage in the above described prior art methods for the preparation of magnesium carbonate hydroxide that the first step of the process is preparation of magnesium orthocarbonate which must be converted into the desired product by aging in a liquid medium at a high temperature. Accordingly, the process is necessarily very complicated because adequate control is essential In both of the steps for the formation of the magnesium orthocarbonate as a precursor and for the conversion of the same into the magnesium carbonate hydroxide.

As a process for the preparation of a calcium-magnesium carbonate composite, it is known since old that dolomite, which is a double carbonate of calcium and magnesium, typically, of the formula $CaMg[CO_3]_2$, is calcined and slaked into a hydroxide composite which is then carbonated into the carbonate composite (see, for example, Japanese patent publications No. 31-7277, No. 32-632, No. 33-1863 and No. 37-4103). In the carbonation reaction of the hydroxide composite, it is known that the reaction proceeds in two steps due to the difference in the basicity of the hydroxides that the carbonation of calcium hydroxide first proceeds followed by the carbonation of magnesium hydroxide so that adequate control of the conditions of the carbonation reaction can provide a uniform composite of calcium carbonate and magnesium carbonate hydroxide. In this case also, however, the magnesium carbonate hydroxide can be formed only from the orthocarbonate as a precursor.

SUMMARY OF THE INVENTION

The present invention accordingly has an object to provide a uniform composite of calcium carbonate and magnesium carbonate hydroxide useful in the above mentioned applications without the problems and disadvantages in the prior art products. A further object of the invention is to provide an efficient and reliable method for the preparation of the above mentioned uniform composite of calcium carbonate and magnesium carbonate hydroxide.

Thus, the calcium magnesium carbonate composite provided by the present invention is a uniform blend of:
(A) particles of calcium carbonate having a crystalline structure of aragonite with a columnar particle configuration having an average length in the range from 0.5 to 3 $\mu$m and an average diameter in the range from 0.1 to 0.3 $\mu$m with an aspect ratio in the range from 5 to 15; and
(B) particles of magnesium carbonate hydroxide having a plate-like particle configuration with an average particle diameter, which is the so called Fere diameter, in the range from 2 to 7 $\mu$m and an average thickness in the range from 0.05 to 0.5 $\mu$m,
the blend having an overall specific surface area in the range from 15 to 30 $m^2/g$ and the weight proportion of the particles of calcium carbonate to the particles of magnesium carbonate hydroxide being in the range from 95:5 to 50:50 calculated as the respective hydroxides.

The above defined carbonate composite can be prepared by a method which comprises the steps of:
(a) preparing an aqueous slurry of calcium hydroxide, of which an aqueous suspension in a concentration of 400 g/liter has a viscosity of at least 1500 centipoise at 25° C., and magnesium hydroxide in a weight proportion in the range from 95:5 to 50:50 by weight, the solid content of the aqueous slurry being in the range from 100 to 250 g/liter calculated by taking the amount of the magnesium hydroxide to be equal to the equimolar amount of calcium hydroxide;
(b) keeping the aqueous slurry at a temperature of 30° C. or higher;
(c) introducing carbon dioxide gas either as such or as diluted with a non-reactive gas into the aqueous slurry at a rate in the range from 1 to 3 liters (N.T.P.) per minute per kg of the calcium hydroxide in the aqueous slurry prepared in step (a) until the aqueous slurry has a value of pH not higher than 10; and
(d) introducing carbon dioxide gas either as such or as diluted with a non-reactive gas into the aqueous slurry after step (c) at a rate of at least 5 liters (N.T.P.) per minute per kg of the magnesium hydroxide in the aqueous slurry prepared in step (a) until the aqueous slurry has a value of pH not higher than 8.

Alternatively, the carbonate composite can be prepared by another method which comprises the steps of:
(a1) preparing an aqueous slurry of calcium hydroxide, of which an aqueous suspension in a concentration of 400 g/liter has a viscosity of at least 1500 centipoise at 25° C., and magnesium hydroxide in a weight proportion in the range from 95;5 to 50:50 by weight, the solid content of the aqueous slurry being in the range from 100 to 250 g/liter calculated by taking the amount of the magnesium hydroxide to be equal to the equimolar amount of calcium hydroxide;
(b1) keeping the aqueous slurry at a temperature in the range from 5° to 30° C.;
(c1) introducing carbon dioxide gas either as such or as diluted with a non-reactive gas into the aqueous slurry at a rate in the range from 7 to 15 liters (N.T.P.) per minute per kg of the calcium hydroxide in the aqueous slurry prepared in step (a1) until conversion of the calcium hydroxide into calcium carbonate is in the range from 5 to 15%;
(d1) introducing carbon dioxide gas either as such or as diluted with a non-reactive gas into the aqueous slurry after step (c1) at a rate in the range from 0.5 to 2 liters (N.T.P.) per minute per k9 of the calcium hydroxide in the aqueous slurry prepared in step (a1) until conversion of the calcium hydroxide into calcium carbonate is in the range from 40 to 60%;
(e1) introducing carbon dioxide gas either as such or as diluted with a non-reactive gas into the aqueous slurry after step (d1) at a rate exceeding 2.0 liters or, preferably, 2.5 liters or, more preferably, 3.0 liters (N.T.P.) per minute per kg of the magnesium hydroxide in the aqueous slurry prepared in step (a1) until the aqueous slurry has a value of pH not higher than 10; and
(f1) introducing carbon dioxide gas either as such or as diluted with a non-reactive gas into the aqueous slurry after step (e1) at a rate of at least 5 liters (N.T.P.) per minute per kg of the magnesium hydroxide in the aqueous slurry prepared in step (a1) until the aqueous slurry has a value of pH not higher than 8.

In the above described methods for the preparation of the carbonate composite, it is possible that, in place of preparing a mixed aqueous slurry of calcium hydroxide and magnesium hydroxide prepared separately, dolomite as a natural mineral is calcined and hydrated into a composite of calcium and magnesium hydroxides which is dispersed in water to give the starting aqueous slurry of calcium and magnesium hydroxides. The use of dolomite as the starting material naturally has a limitation in respect of the proportion of calcium and magnesium in the product although natural products of dolomite have varied compositions relative to the proportion of calcium and magnesium in a considerably wide range.

DETAILED DESCRIPTION OF THE PREFERRED EMBODIMENTS

As is described above, the novel calcium-magnesium carbonate composite of the invention characteristically consists of a uniform blend of particles of calcium carbonate and particles of magnesium carbonate hydroxide each having a specific particle configuration and specific particle size parameters. Further, it is desirable that the calcium carbonate particles have an aspect ratio, i.e. the ratio of the length to the diameter of the columnar particles, in the range from 5 to 15.

When the component particles are too fine, the particles would strongly agglomerate in the blend with decreased distensibility so that, when the carbonate composite is used as a pigment for paper coating, the coated paper would suffer a decrease in the whiteness or opacity. When the particles are too coarse, on the other hand, a decrease is also caused in the whiteness of the powder per se and also in the white-paper gloss and printing gloss as well as ink absorptivity and ink setting in printing of the paper sheets coated therewith.

The overall specific surface area of the carbonate composite, which should be in the range from 15 to 30 $m^2/g$, is another important parameter having influences on the quality of the carbonate composite powder. When the specific surface area is too small, the crystallinity of the particles is decreased adversely affecting the optical properties of the powder and printing adaptability of the paper sheets coated therewith. On the other hand, no further improvement can be obtained by increasing the specific surface area to exceed the above mentioned upper limit rather with an economical disadvantage due to an increase in the necessary amount of a dispersing aid to fully dispersing the carbonate composite powder.

The carbonate composite of the invention should consist of calcium carbonate and magnesium carbonate hydroxide in a weight proportion in the range from 95:5 to 50:50 calculated each as the hydroxide or, namely, by taking the amount of the respective carbonates to be equal to the equimolar amount of the hydroxide. When the content of calcium carbonate is too large, the desirable effects to be obtained by the composite with magnesium carbonate hydroxide cannot be obtained while no further improvement can be obtained by increasing the content of the magnesium compound to exceed the upper limit rather with an economical disadvantage due to the relative expensiveness of the magnesium compound.

The above defined calcium-magnesium carbonate composite of the invention can be prepared by the carbonation reaction of a mixed aqueous slurry of calcium hydroxide and magnesium hydroxide with carbon dioxide gas under very exactly controlled conditions in two different ways. First of the methods, which is a two-step carbonation method, comprises the steps of:

(a) preparing an aqueous slurry of calcium hydroxide, of which an aqueous suspension in a concentration of 400 g/liter has a viscosity of at least 1500 centipoise at 25° C., and magnesium hydroxide in a weight proportion in the range from 95:5 to 50:50 by weight, the solid content of the aqueous slurry being in the range from 100 to 250 g/liter calculated by taking the amount of the magnesium hydroxide to be equal to the equimolar amount of calcium hydroxide;

(b) keeping the aqueous slurry at a temperature of 30 C or higher;

(c) introducing carbon dioxide gas either as such or as diluted with a non reactive gas into the aqueous slurry at a rate in the range from 1 to 3 liters (N.T.P.) per minute per kg of the calcium hydroxide in the aqueous slurry prepared in step (a) until the aqueous slurry has a value of pH not higher than 10; and (d) introducing carbon dioxide gas either as such or as diluted with a non-reactive gas into the aqueous slurry after step (c) at a rate of at least 5 liters (N.T.P.) per minute per k9 of the magnesium hydroxide in the aqueous slurry prepared in step (a) until the aqueous slurry has a value of pH not higher than 8.

The procedure of step (a) for the preparation of a mixed aqueous slurry of calcium hydroxide and magnesium hydroxide isperformed preferably by first preparing an aqueous slurry of calcium hydroxide into which magnesium hydroxide either as such or In the form of a separately prepared aqueous slurry is added.

The calcium hydroxide powder should have a specific characteristic parameter of the viscosity of an aqueous suspension thereof. Namely, an aqueous suspension thereof in a concentration of 400 g/liter should have a viscosity of at least 1500 centipoise or, preferably, at least 2000 centipoise at 25° C. The aqueous suspension suitable for the viscosity measurement can be prepared by adding a calculated and weighed amount of calcium hydroxide into water and thoroughly agitating the mixture by using a stirrer machine of a high-speed impellor type such as a Cowless mixer until a uniform dispersion can be obtained. Measurement of the viscosity of the suspension can be performed by using a Brookfield viscosimeter equipped with a No. 3 or No. 4 rotor rotated at 60 rpm.

The cabonating gas is carbon dioxide which can be introduced into the aqueous slurry of calcium hydroxide and magnesium hydroxide either as such or as diluted with a non-reactive gas such as air and nitrogen. When diluted with such a non-reactive gas, the concentration of carbon dioxide in the gaseous mixture should be at least 15% by volume or, preferably, at least 30% by volume. Therefore, various kinds of off-gases from an industrial process using a furnace or kiln can be used as such provided no reactive gases are contained therein.

When carbon dioxide gas is continuously introduced into the mixed aqueous slurry of calcium hydroxide and magnesium hydroxide, the reaction first taking place is the carbonation reaction of calcium hydroxide with carbon dioxide to form calcium carbonate particles and the carbonation reaction of magnesium hydroxide is started only when almost all of the calcium hydroxide has been converted into calcium carbonate. The end point of the carbonation reaction of calcium hydroxide can be detected by continuously monitoring the pH value of the aqueous slurry. When the carbonation reaction of calcium hydroxide has come near to the end, the pH value of the aqueous slurry, which is about 12.4 before the start of the carbonation reaction, is decreased. When the decreasing value of pH has reached 10, the first step of the carbonation reaction, i.e. step (c), can be terminated to start the reaction of step (d). Similarly, the carbonation reaction with carbon dioxide gas in step (d) can be terminated when the pH value of the aqueous slurry is 8 or below, which indicates the end point of the carbonation reaction of magnesium hydroxide. Along with monitoring of the decrease in the value of pH, it is a convenient way for determining the end point of step (d) to continuously monitor the electric conductivity of the aqueous slurry, which continuously varies as the carbonation reaction proceeds but levels off when the carbonation reaction of magnesium hydroxide, i.e. the reaction in step (d), has come to the end showing substantially no further changes.

In the second method for the carbonation of the aqueous slurry with carbon dioxide to obtain the inventive carbonate composite, the reaction conditions are controlled in four steps so that the method comprises the steps of:

(a1) preparing an aqueous slurry of calcium hydroxide, of which an aqueous suspension in a concentration of 400 g/liter has a viscosity of at least 1500 centipoise at 25° C., and magnesium hydroxide in a weight proportion in the range from 95:5 to 50:50 by weight, the solid content of this aqueous slurry being in the range from 100 to 250 g/liter calculated by taking the amount of the magnesium hydroxide to be equal to the equimolar amount of calcium hydroxide;

(b1) keeping the aqueous slurry at a temperature in the range from 5° to 30° C. or, preferably, from 5° to 20° C.;

(c1) introducing carbon dioxide gas either as such or as diluted with a non-reactive gas into the aqueous slurry at a rate in the range from 7 to 15 liters (N.T.P.) per minute per kg of the calcium hydroxide in the aqueous slurry prepared in step (a1) until conversion of the calcium hydroxide into calcium carbonate is in the range from 5 to 15%;

(d1) introducing carbon dioxide gas either as such or as diluted with a non-reactive gas into the aqueous slurry after step (c1) at a rate in the range from 0.5 to 2 liters (N.T.P.) per minute per kg of the calcium hydroxide in the aqueous slurry prepared in step (a1) until conversion of the calcium hydroxide into calcium carbonate is in the range from 40 to 60%;

(e1) introducing carbon dioxide gas either as such or as diluted with a non-reactive gas into the aqueous slurry after step (d1) at a rate exceeding 2 liters or, preferably, 2.5 liters (N.T.P.) per minute per kg of the magnesium hydroxide in the aqueous slurry prepared in step (a1) until the aqueous slurry has a value of pH not higher than 10; and (f1) introducing carbon dioxide gas either as such or as diluted with a non-reactive gas into the aqueous slurry after step (e1) at a rate of at least 5 liters (N.T.P.) per minute per kg of the magnesium hydroxide in the aqueous slurry prepared in step (a1) until the aqueous slurry has a value of pH not higher than 8.

In the above described methods for the preparation of the carbonate composite, it is possible that, in place of preparing a mixed aqueous slurry of calcium hydroxide and magnesium hydroxide prepared separately, dolomite as a natural mineral is calcined and hydrated into a composite hydroxide of calcium and magnesium which is dispersed in water to give an aqueous slurry of calcium and magnesium hydroxides in a specified concentration to be subjected to the carbonation reaction although the use of dolomite as the starting material naturally has a limitation in respect of the proportion of calcium and magnesium in the product. It is preferable that the hydroxide composite prepared by calcining and hydrating dolomite to be used as the starting material of the inventive method should give an aqueous suspension in a concentration of 400 g/liter having a viscosity of at least 1500 centipoise or, more preferably, at least 2000 centipoise at 25 ° C.

This method of starting from dolomite is sometimes economical as compared with the method starting from separately prepared calcium hydroxide and magnesium hydroxide. A problem in this method is, as is mentioned above, that the ratio of calcium and magnesium in the product carbonate composite is determined without versatility by the proportion in the starting dolomite which is typically equimolar as is expressed by the formula of the chemical composition of dolomite but can be varied though within a certain range. It is of course optional that the hydroxide composite derived from dolomite is admixed with separately prepared calcium hydroxide or magnesium hydroxide so as to obtain a desired calcium:magnesium proportion in the range from 95:5 to 50:50 as hydroxides.

The calcium magnesium carbonate composite prepared by the above described method is a novel material having usefulness as a filler or pigment in paper making, paper coating, formulation of rubbers, plastics, printing inks, paints and many other fields. When it is used as a pigment in paper coating, for example, the coated paper is imparted with high white-paper gloss as well as excellent print ability such as the printing strength, ink absorptivity, ink setting and the like. When it is used as a filler in a plastic resin, the resin composition can give shaped articles having greatly improved whiteness and mechanical strengths.

The above described novel calcium-magnesium carbonate composite can be obtained only by the above described unique but relatively simple method of the invention. Mere blending of separately prepared powders of calcium carbonate and magnesium carbonate hydroxide can never give a uniform carbonate composite equivalent to the inventive composite because of the extreme difficulty in uniformly and intimately blending the two quite different powders each from the other. If it could ever be possible to obtain a uniform blend of separately prepared powders of calcium carbonate and magnesium carbonate hydroxide by applying a very intense mixing force, the resulting blend can never exhibit the excellent performance as the inventive carbonate composite because of the unavoidable comminution of the individual particles by the so intense shearing force.

In the following, the inventive calcium-magnesium carbonate composite and the method for the preparation thereof are described in more detail by way of examples which, however, never limit the scope of the invention in any way.

EXAMPLE 1

An aqueous suspension of calcium hydroxide in a concentration of 400 g/liter was prepared and vigorously and thoroughly agitated with a Cowless mixer. The aqueous suspension or lime milk had a viscosity of 2500 centipoise at 25° C. as determined using a Brookfield viscosimeter with a rotor rotated at 60 rpm.

A 6.8 liter portion of the thus prepared lime milk was admixed with 300 g of magnesium hydroxide and water to make up a volume of 15 liters. The concentration of the thus prepared aqueous slurry was 206 g/liter by a calculation in which the amount of the magnesium hydroxide was taken as equal to the equimolar amount of calcium hydroxide. While keeping the temperature of this aqueous slurry at 40° C., a 30:66:4 by volume mixture of carbon dioxide, nitrogen and oxygen was blown into the aqueous slurry at a rate of 1.1 $m^3$ (N.T.P.) per hour. This rate of gas blowing corresponds to 2 liters of carbon dioxide (N.T.P.) per minute per kg of calcium hydroxide. Blowing of the carbon dioxide-containing gas was continued at the same rate until the pH value of the aqueous slurry dropped to 10. Thereafter, the rate of gas blowing was decreased to and maintained at 0.60 $m^3$ (N.T.P.) per hour. This rate of gas blowing corresponds to 10 liters of carbon dioxide (N.T.P.) per minute per kg of magnesium hydroxide contained in the starting aqueous slurry. Blowing of the carbon dioxide-containing gas was continued until the pH value of the aqueous slurry dropped to 7.3 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 2.2 $\mu$m and an average particle diameter of 0.20 $\mu$m and plate like or flaky particles of magnesium carbonate hydroxide having an average diameter of 5.3 $\mu$m and an average thickness of 0.14 $\mu$m.

The aqueous slurry was subjected to primary dehydration by using a filter press and then to secondary dehydration by using a belt press to give cakes of the carbonate composite which was dried and disintegrated into a powdery carbonate composite. This product powder had a specific surface area of 15.8 $m^2/g$ as determined by the BET method.

EXAMPLE 2

An aqueous slurry was prepared under agitation by admixing 5.3 liters of the same lime milk as prepared in Example 1 with 900 q of magnesium hydroxide followed by the addition of water to make up a volume of 15 liters. The concentration of the hydroxides in this aqueous slurry was 215 g/liter by the calculation taking the amount of magnesium hydroxide to be equal to the equimolar amount of calcium hydroxide. The temperature of this aqueous slurry was adjusted to 40 ° C. and the same carbon dioxide containing gas as used in Example 1 was blown into the aqueous slurry at a constant rate of 0.85 $m^3$ (N.T.P.) per hour. This rate of gas blowing corresponds to 2 liters (N.T.P.) of carbon dioxide per minute per kg of the calcium hydroxide contained in the starting aqueous slurry. When the pH value of the aqueous slurry had dropped to 10, the rate of gas blowing was increased to and maintained at 1.8 $m^3$ (N.T.P.)

per hour corresponding to 10 liters (N.T.P.) of carbon dioxide per minute per kg of the magnesium hydroxide contained in the starting aqueous slurry. Blowing of the carbon dioxide-containing gas was continued until the pH value of the aqueous slurry dropped to 7.2 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 2.0 $\mu$m and an average particle diameter of 0.17 $\mu$m and plate-like or flaky particles of magnesium carbonate hydroxide having an average diameter of 3.8 $\mu$m and an average thickness of 0.21 $\mu$m. The product powder prepared by dehydration, drying and disintegration in the same manner as in Example 1 had a specific surface area of 22.2 m$^2$/g as determined by the BET method.

EXAMPLE 3

An aqueous slurry was prepared by dispersing 2.4 kg of calcium hydroxide, which was the same as used in Example 1, and 600 g of magnesium hydroxide in cold water with addition of water to make up a volume of 15 liters. Blowing of the same carbon dioxide containing gas as used in Example 1 was started into the aqueous slurry kept at a temperature of 9° C. at a constant rate of 4.8 m$^3$ (N.T.P.) per hour corresponding to 10 liters (N.T.P.) of carbon dioxide per minute per kg ol the calcium hydroxide contained in the starting aqueous slurry until the conversion of calcium hydroxide into calcium carbonate had reached 10%.

Thereafter, the rate of gas blowing was decreased to and maintained at 0.72 m$^3$ (N.T.P.) per hour corresponding to 1.5 liters (N.T.P.) of carbon dioxide per minute per kg of the calcium hydroxide contained in the starting aqueous slurry until the conversion of calcium hydroxide into calcium carbonate had reached 55% when the pH value of the aqueous slurry was 11.7.

Further, the rate of gas blowing was increased to and maintained at 1.9 m$^3$ (N.T.P.) per hour corresponding to 4 liters (N.T.P.) of carbon dioxide per minute per kg of the calcium hydroxide contained in the starting aqueous slurry until the pH value of the aqueous slurry dropped to 10.

Finally, the rate of gas blowing was decreased to and maintained at 1.2 m$^3$ (N.T.P.) per hour corresponding to 10 liters (N.T.P.) of carbon dioxide per minute per kg of the magnesium hydroxide contained in the starting aqueous slurry until the pH value of the aqueous slurry dropped to 7.2 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 1.6 $\mu$m and an average particle diameter of 0.18 $\mu$m and plate-like or flaky particles of magnesium carbonate hydroxide having an average diameter of 4.7 $\mu$m and an average thickness of 0.18 $\mu$m. The product powder prepared by dehydration, drying and disintegration of the slurry had a specific surface area of 18.0 m$^2$/g as determined by the BET method.

EXAMPLE 4

An aqueous slurry was prepared by dispersing 1.5 kg of calcium hydroxide and 1.5 kg of magnesium hydroxide in cold water with addition of water to make up a volume of 15 liters. 8lowing of the same carbon dioxide-containing gas as used in Example 1 was started into the aqueous slurry kept at a temperature of 12° C. at a constant rate of 3.0 m$^3$ (N.T.P.) per hour corresponding to 10 liters (N.T.P.) of carbon dioxide per minute per kg of the calcium hydroxide contained in the starting aqueous slurry until the conversion of calcium hydroxide into calcium carbonate had reached 9%.

Thereafter, the rate of gas blowing was decreased to and maintained at 0.45 m$^3$ (N.T.P.) per hour corresponding to 1.5 liters (N.T.P.) of carbon dioxide per minute per kg of the calcium hydroxide contained in the starting aqueous slurry until the conversion of calcium hydroxide into calcium carbonate had reached 52% when the pH value of the aqueous slurry was 11.7.

Further, the rate of gas blowing was increased to and maintained at 1.2 m$^3$ (N.T.P.) per hour corresponding to 4 liters (N.T.P.) of carbon dioxide per minute per kg of the calcium hydroxide contained in the starting aqueous slurry until the pH value of the aqueous slurry dropped to 10.

Finally, the rate of gas blowing was increased to and maintained at 3.0 m$^3$ (N.T.P.) per hour corresponding to 10 liters (N.T.P.) of carbon dioxide per minute per kg of the magnesium hydroxide contained in the starting aqueous slurry until the pH value of the aqueous slurry dropped to 7.5 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 1.8 $\mu$m and an average particle diameter of 0.16 $\mu$m and plate-like or flaky particles of magnesium carbonate hydroxide having an average diameter of 4.5 $\mu$m and an average thickness of 0.22 $\mu$m. The product powder prepared by dehydration, drying and disintegration of the slurry had a specific surface area of 27.0 m$^2$/g as determined by the 8ET method.

EXAMPLE 5

Dolomite ore was calcined at 1100° C. for 2 hours and then slaked In a dry process to be converted into a hydroxide composite of calcium and magnesium which was dispersed in water to give an aqueous slurry having a concentration of 4 kg in 10 liters by using a Cowless mixer, and a viscosity of 3500 centipoise at 25° C. The aqueous slurry was admixed with additional 10 liters of water and passed through a screen strainer of 325 mesh fineness to remove coarser particles. The thus obtained aqueous slurry in a volume of 17.5 liters contained the hydroxides in an overall concentration of 160 g/liter by the calculation taking the amount of magnesium hydroxide to be equal to the equimolar amount of calcium hydroxide. The weight proportion of magnesium hydroxide to the total of the calcium and magnesium hydroxides in this slurry was 18.3% according to the result of chemical analysis.

The temperature of 15 liters of this aqueous slurry was adjusted to 40° C. and the same carbon dioxide-containing gas as used in Example 1 was blown into the aqueous slurry at a constant rate of 0.75 m$^3$ (N.T.P.) per hour. This rate of gas blowing corresponds to 2 liters (N.T.P.) of carbon dioxide per minute per kg of the calcium hydroxide contained in the starting aqueous slurry. When the pH value of the aqueous slurry had dropped to 10, the rate of gas blowing was increased to and maintained at 0.83 m$^3$ (N.T.P.) per hour corresponding to 10 liters (N.T.P.) of carbon dioxide per minute per kg of the magnesium hydroxide contained in the starting aqueous slurry. Blowing of the carbon dioxide-containing gas was continued until the pH value of the aqueous slurry dropped to 7.4 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 2.0 μm and an average particle diameter of 0.22 μm and plate like or flaky particles of magnesium carbonate hydroxide having an average diameter of 6.2 μm and an average thickness of 0.19 μm. The product powder prepared by dehydration, drying and disintegration of the slurry had a specific surface area of 17.9 m$^2$/g as determined by the BET method.

EXAMPLE 6

Dolomite ore was calcined at 1100° C. for 2 hours and then slaked in a dry process to be converted into a hydroxide composite of calcium and magnesium which was dispersed in water by using a Cowless mixer to give an aqueous slurry in a concentration of 4 kg per 10 liters having a viscosity of 2800 centipoise at 25° C. The aqueous slurry was admixed with additional 10 liters of water and passed through a screen strainer of 326 mesh fineness to remove coarser particles. The thus obtained aqueous slurry in a volume of 17.0 liters contained the hydroxides in an overall concentration of 170 g/liter by the calculation taking the amount of magnesium hydroxide to be equal to the equimolar amount of calcium hydroxide. The weight proportion of magnesium hydroxide to the total of the calcium and magnesium hydroxides in this slurry was 36.8% according to the result of chemical analysis.

The temperature of 15 liters of this aqueous slurry was adjusted to 40° C. and the same carbon dioxide-containing gas as used in Example 1 was blown into the aqueous slurry at a constant rate of 0.59 m$^3$ (N.T.P.) per hour. This rate of gas blowing corresponds to 2 liters (N.T.P.) of carbon dioxide per minute per kg of the calcium hydroxide contained in the starting aqueous slurry. When the pH value of the aqueous slurry had dropped to 10, the rate of gas blowing was increased to and maintained at 1.7 m$^3$ (N.T.P.) per hour corresponding to 10 liters (N.T.P.) of carbon dioxide per minute per kg of the magnesium hydroxide contained in the starting aqueous slurry. Blowing of the carbon dioxide-containing gas was continued until the pH value of the aqueous slurry dropped to 7.3 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 2.4 μm and an average particle diameter of 0.23 μm and plate-like or flaky particles of magnesium carbonate hydroxide having an average diameter of 5.8 μm and an average thickness of 0.19 μm. The product powder prepared by dehydration, drying and disintegration of the slurry had a specific surface area of 25.8 m$^2$/g as determined by the BET method.

EXAMPLE 7

An aqueous slurry was prepared by dispersing 4 kg of a hydroxide composite of calcium and magnesium derived from dolomite in 20 liters of water followed by straining through a screen strainer of 325 mesh fineness to remove coarser particles to give 16 liters of an aqueous slurry. The aqueous slurry contained 158 g/liter of the hydroxides by the calculation taking the amount of magnesium hydroxide to be equal to the equimolar amount of calcium hydroxide. The weight proportion of magnesium hydroxide to the total of te calcium and magnesium hydroxides in this slurry was 10.5% according to the result of chemical analysis.

Blowing of the same carbon dioxide-containing gas as used in Example 1 was started into 15 liters of the aqueous slurry kept at a temperature of 10° C. at a constant rate of 4.1 m$^3$ (N.T.P.) per hour corresponding to 10 liters (N.T.P.) of carbon dioxide per minute per kg of the calcium hydroxide contained in the starting aqueous slurry until the conversion of calcium hydroxide into calcium carbonate had reached 11%.

Thereafter, the rate of gas blowing was decreased to and maintained at 0.62 m$^3$ (N.T.P.) per hour corresponding to 1.5 liters (N.T.P.) of carbon dioxide per minute per kg of the calcium hydroxide contained in the starting aqueous slurry until the conversion of calcium hydroxide into calcium carbonate had reached 47% when the pH value of the aqueous slurry was 11.7.

Further, the rate of gas blowing was increased to and maintained at 1.7 m$^3$ (N.T.P.) per hour corresponding to 4 liters (N.T.P.) of carbon dioxide per minute per kg of the calcium hydroxide contained in the starting aqueous slurry until the pH value of the aqueous slurry dropped to 10.

Finally, the rate of gas blowing was decreased to and maintained at 0.48 m$^3$ (N.T.P.) per hour corresponding to 10 liters (N.T.P.) of carbon dioxide per minute per kg of the magnesium hydroxide contained in the starting aqueous slurry until the pH value of the aqueous slurry dropped to 7.3 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 2.1 μm and an average particle diameter of 0.19 μm and plate-like or flaky particles of magnesium carbonate hydroxide having an average diameter of 4.2 μm and an average thickness of 0.17 μm. The product powder prepared by dehydration, drying and disintegration of the slurry had a specific surface area of 16.2 m$^2$/g as determined by the BET method.

EXAMPLE 8

An aqueous slurry was prepared by dispersing 4 kg of a hydroxide composite of calcium and magnesium derived from dolomite in 20 liters of water followed by straining through a screen strainer of 325 mesh fineness to remove coarser particles to give 17 liters of an aqueous slurry. The aqueous slurry contained 146 g/liter of the hydroxides by the calculation taking the amount of magnesium hydroxide to be equal to the equimolar amount of calcium hydroxide. The weight proportion of magnesium hydroxide to the total of calcium and magnesium hydroxides in this slurry was 28.3% according to the result of chemical analysis.

Blowing of the same carbon dioxide-containing gas as used in Example 1 was started into 15 liters of the aqueous slurry kept at a temperature of 10° C. at a constant rate of 2.9 m$^3$ (N.T.P.) per hour corresponding to 10 liters (N.T.P.) of carbon dioxide per minute per kg of the calcium hydroxide contained in the starting aqueous slurry until the conversion of calcium hydroxide into calcium carbonate had reached 11%.

Thereafter, the rate of gas blowing was decreased to and maintained at 0.44 m$^3$ (N.T.P.) per hour corresponding to 1.5 liters (N.T.P.) of carbon dioxide per minute per kg of the calcium hydroxide contained in the starting aqueous slurry until the conversion of calcium hydroxide into calcium carbonate had reached 47% when the pH value of the aqueous slurry was 11.7.

Further, the rate of gas blowing was increased to and maintained at 1.2 m$^3$ (N.T.P.) per hour corresponding to 4 liters (N.T.P.) of carbon dioxide per minute per kg of the calcium hydroxide contained in the starting aqueous slurry. This rate of gas blowing, which corresponded to 4.0 liters (N.T.P.) of carbon dioxide per minute per kg of the magnesium hydroxide contained in the starting aqueous slurry, was maintained after the pH value of the aqueous slurry dropped to 10 until the pH value of the aqueous slurry dropped to 7.3 when the electric conductivity of the aqueous slurry levelled off to show no further substantial changes.

The thus obtained aqueous slurry was examined by the scanning electron microscopy and X-ray diffractometry to find that the precipitates contained therein were a uniform blend of columnar particles of calcium carbonate of the aragonitic crystalline structure having an average particle length of 1.7 μm and an average particle diameter of 0.19 μm and plate-like or flaky particles of magnesium carbonate hydroxide having an average diameter of 4.5 μm and an average thickness of 0.22 μm. The product powder prepared by dehydration, drying and disintegration of the slurry had a specific surface area of 23.1 m$^2$/g as determined by the BET method.

Comparative Example 1

An aqueous slurry was prepared by diluting 7.5 liters of the lime milk prepared in Example 1 with water to make up a volume of 15 liters. The concentration of calcium hydroxide in this slurry was 197 g/liter. The same carbon-dioxide-containing gas as used in Example 1 was blown into the aqueous slurry kept at 40° C. at a constant rate of 1.2 m$^3$ (N.T.P.) per hour corresponding to 2 liters (N.T.P.) of carbon dioxide per minute per kg of the calcium hydroxide contained in the starting aqueous slurry until complete conversion of the calcium hydroxide into calcium carbonate. The precipitates contained in the slurry were examined by the scanning electron microscopy and X ray diffractometry to find that the precipitates consisted of columnar particles of calcium carbonate of the aragonitic crystalline structure having an average particle length of 2.1 μm and an average particle diameter of 0.18 μm.

The aqueous slurry was then admixed with 526 g of a powder of magnesium carbonate hydroxide to give a mixture of which the weight proportion of the magnesium carbonate hydroxide to calcium carbonate was 10:90 by the calculation taking the amounts of both of the calcium carbonate and magnesium carbonate hydroxide to be equal to the equimolar amounts of the respective hydroxides. After vigorous agitation of the mixed slurry but not to cause comminution of the particles, the powder mixture contained in the slurry was examined by the scanning electron microscopy to find that the state of dispersion of the respective powder particles was not uniform. The aqueous slurry was dehydrated, dried and disintegrated in the same manner as in Example 1 into a powdery product which had a specific surface area of 14.3 m$^2$/g by the BET method.

Comparative Example 2

An aqueous slurry was prepared by diluting 7.5 liters of the lime milk prepared in Example 1 with water to make up a volume of 15 liters. The concentration of calcium hydroxide in this slurry was 195 q/liter. The same carbon-dioxide-containing gas as used in Example 1 was blown into the aqueous slurry kept at 40° C. at a constant rate of 1.2 m$^3$ (N.T.P.) per hour corresponding to 2 liters (N.T.P.) of carbon dioxide per minute per kg of the calcium hydroxide contained in the starting aqueous slurry until complete conversion of the calcium hydroxide into calcium carbonate.

The precipitates contained in the slurry were examined by the scanning electron microscopy and X-ray diffractometry to find that the precipitates consisted of columnar particles of calcium carbonate of the aragonitic crystalline structure having an average particle length of 2.3 μm and an average particle diameter of 0.19 μm.

The aqueous slurry was then admixed with 2015 g of a powder of magnesium carbonate hydroxide to give a mixture of which the weight proportion of the magnesium carbonate hydroxide to calcium carbonate was 30:70 by the calculation taking the amounts of both of the calcium carbonate and magnesium carbonate hydroxide to be equal to the equimolar amounts of the respective hydroxides. After vigorous agitation of the mixed slurry but not to cause comminution of the particles, the powder mixture contained in the slurry was examined by the scanning electron microscopy to find that the state of dispersion of the respective powder particles was not uniform. The product powder prepared by dehydration, drying and disintegration of the aqueous slurry had a specific surface area of 17.3 m$^2$/g.

Comparative Example 3

An aqueous slurry was prepared by diluting 7.5 liters of the lime milk prepared in Example 1 with water to make up a volume of 15 liters. The concentration of calcium hydroxide in this slurry was 191 g/liter. The same carbon-dioxide-containing gas as used in Example 1 was blown into the aqueous slurry kept at 40° C. at a constant rate of 1.1 m$^3$ (N.T.P.) per hour corresponding to 2 liters (N.T.P.) of carbon dioxide per minute per kg of the calcium hydroxide contained in the starting aqueous slurry until complete conversion of the calcium hydroxide into calcium carbonate.

The aqueous slurry was then admixed with 318 g of a powder of magnesium hydroxide. The magnesium:calcium ratio in the mixed slurry corresponded to 10:90 by weight by the calculation taking the amount of the calcium carbonate to be equal to the equimolar amount of calcium hydroxide.

Further, the same carbon dioxide-containing gas was blown into the aqueous slurry at a constant rate of 0.64 m³ (N.T.P.) per hour corresponding to 10 liters (N.T.P.) of carbon dioxide per minute per kg of the magnesium hydroxide in the starting slurry until the pH value of the aqueous slurry dropped to 7.3 when the electric conductivity of the aqueous slurry levelled off to show no further substantial changes.

The aqueous slurry obtained in this manner was examined by the scanning electron microscopy and X ray diffractometry to find that the precipitates contained therein consisted of columnar particles of calcium carbonate of the aragonitic crystalline structure having an average particle length of 1.9 μm and an average particle diameter of 0.17 μm and gel-like particles of magnesium carbonate hydroxide having very low crystallinity. The product powder prepared by dehydration, drying and disintegration of the aqueous slurry had a specific surface area of 11.4 m²/g as determined by the BET method.

Application Example

The cakes of the carbonate composite obtained in each of Examples 1 to 4 and Comparative Examples 1 to 3 were dispersed in water with addition of a dispersing aid to give an aqueous slurry of which the content of the solid matter was 50 to 60% by weight. A 100 parts by weight portion calculated as solid of the slurry was admixed with 10 parts by weight as solid of a binder, which was a 1:4 by weight mixture as solid of starch and a SBR latex, and 1.5 parts by weight of calcium stearate as a lubricant and further diluted with addition of water to have a solid content of 25 to 50% by weight. Paper coating test was undertaken by using the thus prepared aqueous slurry as the coating liquid in a coating amount of 10 g/m² as dried. The thus prepared coated paper sheets were evaluated for the items given below in the testing procedures indicated there to give the results shown in Table 1.

TABLE 1

| | Example | | | | Comparative Example | | |
|---|---|---|---|---|---|---|---|
| | 1 | 2 | 3 | 4 | 1 | 2 | 3 |
| White-paper gloss, % | 75.0 | 74.0 | 73.0 | 74.5 | 70.0 | 72.3 | 70.6 |
| K & N ink receptivity, % | 20.4 | 26.9 | 25.6 | 28.3 | 16.3 | 21.9 | 21.5 |
| Ink set, % | | | | | | | |
| 1 minute | 69.2 | 77.6 | 74.7 | 78.9 | 60.6 | 63.6 | 64.0 |
| 2 minutes | 76.4 | 80.8 | 79.2 | 82.4 | 69.0 | 72.6 | 73.0 |
| 3 minutes | 78.7 | 82.3 | 80.2 | 84.1 | 72.3 | 74.5 | 76.3 |
| IGT surface strength, cm/second | 110 | 123 | 115 | 118 | 87 | 93 | 98 |

White-paper gloss:
Measurement was performed according to the procedure specified in JIS P 8142.
K & N ink receptivity:
The K & N ink index after 2 minutes ink hold was measured by using a Hunter color meter.
Ink set:
Measurement was performed for the ink transfer after 1, 2 and 3 minutes from printing by using a Hunter color meter.
IGT surface strength:
Measurement was performed according to the procedure specified in JIS P 8129.

What is claimed is:
1. A calcium-magnesium carbonate composite which is a uniform blend of:
 (A) particles of calcium carbonate having a crystalline structure of aragonite with a columnar particle configuration having an average length in the range from 0.5 to 3 μm and an average diameter in the range from 0.1 to 0.3 μm with an aspect ratio in the range from 5 to 15; and
 (B) particles of magnesium carbonate hydroxide having a plate-like particle configuration with an average particle diameter in the range from 2 to 7 μm and a thickness in the range from 0.05 to 0.5 μm, the blend having an overall specific surface area in the range from 15 to 30 m²/g and the weight proportion of the particles of calcium carbonate to the particles of magnesium carbonate hydroxide being in the range from 95:5 to 50:50 calculated as the respective hydroxides.

2. A method for the preparation of a calcium-magnesium carbonate composite consisting of calcium carbonate and magnesium carbonate hydroxide which comprises the steps of:
 (a) preparing an aqueous slurry of calcium hydroxide, of which an aqueous suspension in a concentration of 400 q/liter has a viscosity of at least 1500 centipoise at 25° C., and magnesium hydroxide in a weight proportion in the range from 95:5 to 50:50 by weight, the solid content of the aqueous slurry being in the range from 100 to 250 g/liter, calculated by taking the amount of the magnesium hydroxide to be equal to the equimolar amount of calcium hydroxide;
 (b) keeping the aqueous slurry at a temperature of 30° C. or higher;
 (c) introducing carbon dioxide gas either as such or as diluted with a non-reactive gas into the aqueous slurry at a rate in the range from 1 to 3 liters (N.T.P.) per minute per kg of the calcium hydroxide in the aqueous slurry prepared in step (a) until the aqueous slurry has a value of pH not higher than 10; and
 (d) introducing carbon dioxide gas either as such or as diluted with a non-reactive gas into the aqueous slurry after step (c) at a rate of at least 5 liters (N.T.P.) per minute per kg of the magnesium hydroxide in the aqueous slurry prepared in step (a) until the aqueous slurry has a value of pH not higher than 8.

3. A method for the preparation of a calcium-magnesium carbonate composite consisting of calcium carbonate and magnesium carbonate hydroxide which comprises the steps of:

(a1) preparing an aqueous slurry of calcium hydroxide, of which an aqueous suspension in a concentration of 400 g/liter has a viscosity of at least 1500 centipoise at 25° C., and magnesium hydroxide in a weight proportion in the range from 95:5 to 50:50 by weight, the solid content of the aqueous slurry being in the range from 100 to 250 g/liter, calculated by taking the amount of the magnesium hydroxide to be equal to the equimolar amount of calcium hydroxide;

(b1) keeping the aqueous slurry at a temperature in the range from 5° to 30° C.;

(c1) introducing carbon dioxide gas either as such or as diluted with a non-reactive gas into the aqueous slurry at a rate in the range from 7 to 15 liters (N.T.P.) per minute per kg of the calcium hydroxide in the aqueous slurry prepared in step (a1) until conversion of the calcium hydroxide into calcium carbonate is in the range from 5 to 15%;

(d1) introducing carbon dioxide gas either as such or as diluted with a non-reactive gas into the aqueous slurry after step (c1) at a rate in the range from 0.5 to 2 liters (N.T.P.) per minute per kg of the calcium hydroxide in the aqueous slurry prepared in step (a1) until conversion of the calcium hydroxide into calcium carbonate is in the range from 40 to 60%;

(e1) introducing carbon dioxide gas either as such or as diluted with a non-reactive gas into the aqueous slurry after step (d1) at a rate exceeding 2.5 liters (N.T.P.) per minute per kg of the magnesium hydroxide in the aqueous slurry prepared in step (a1) until the aqueous slurry has a value of pH not higher than 10; and (f1) introducing carbon dioxide gas either as such or as diluted with a non-reactive gas into the aqueous slurry after step (e1) at a rate of at least 5 liters (N.T.P.) per minute per kg of the magnesium hydroxide in the aqueous slurry prepared in step (a1) until the aqueous slurry has a value of pH not higher than 8.

4. A method for the preparation of a calcium-magnesium carbonate composite consisting of calcium carbonate and magnesium carbonate hydroxide which comprises the steps of:

(a2) dispersing a hydrate of calcined dolomite in water to give an aqueous slurry of calcium hydroxide and magnesium hydroxide, the solid content of the aqueous slurry being in the range from 100 to 250 g/liter calculated by taking the amount of the magnesium hydroxide to be equal to the equimolar amount of calcium hydroxide;

(b2) keeping the aqueous slurry at a temperature of 30° C. or higher;

(c2) introducing carbon dioxide gas either as such or as diluted with a non-reactive gas into the aqueous slurry at a rate in the range from 1 to 3 liters (N.T.P.) per minute per kg of the calcium hydroxide in the aqueous slurry prepared in step (a2) until the aqueous slurry has a value of pH not higher than 10; and (d2) introducing carbon dioxide gas either as such or as diluted with a non reactive gas into the aqueous slurry after step (c2) at a rate of at least 5 liters (N.T.P.) per minute per kg of the magnesium hydroxide in the aqueous slurry prepared in step (a2) until the aqueous slurry has a value of pH not higher than 8.

5. A method for the preparation of a calcium-magnesium carbonate composite consisting of calcium carbonate and magnesium carbonate hydroxide which comprises the steps of:

(a3) dispersing a hydrate of calcined dolomite in water to give an aqueous slurry of calcium hydroxide and magnesium hydroxide, the solid content of the aqueous slurry being in the range from 100 to 250 g/liter calculated by taking the amount of the magnesium hydroxide to be equal to the equimolar amount of calcium hydroxide;

(b3) keeping the aqueous slurry at a temperature in the range from 5° to 30° C.;

(c3) introducing carbon dioxide gas either as such or as diluted with a non reactive gas into the aqueous slurry at a rate in the range from 7 to 15 liters (N.T.P.) per minute per kg of the calcium hydroxide in the aqueous slurry prepared in step (a3) until conversion of the calcium hydroxide into calcium carbonate is in the range from 5 to 15%;

(d3) introducing carbon dioxide gas either as such or as diluted with a non reactive gas into the aqueous slurry after step (c3) at a rate in the range from 0.5 to 2 liters (N.T.P.) per minute per kg of the calcium hydroxide in the aqueous slurry prepared in step (a3) until conversion of the calcium hydroxide into calcium carbonate is in the range from 40 to 60%;

(e3) introducing carbon dioxide gas either as such or as diluted with a non-reactive gas into the aqueous slurry after step (d3) at a rate larger than 2.5 liters (N.T.P.) per minute per kg of the magnesium hydroxide in the aqueous slurry prepared in step (a3) until the aqueous slurry has a value of pH not higher than 10; and (f3) introducing carbon dioxide gas either as such or as diluted with a non-reactive gas into the aqueous slurry after step (e3) at a rate of at least 5 liters (N.T.P.) per minute per kg of the magnesium hydroxide in the aqueous slurry prepared in step (a3) until the aqueous slurry has a value of pH not higher than 8.

* * * * *